No. 735,435. PATENTED AUG. 4, 1903.
W. E. ANDERSON & F. L. DYER.
BALE FORMING APPARATUS.
APPLICATION FILED OCT. 7, 1897.
NO MODEL. 5 SHEETS—SHEET 5.
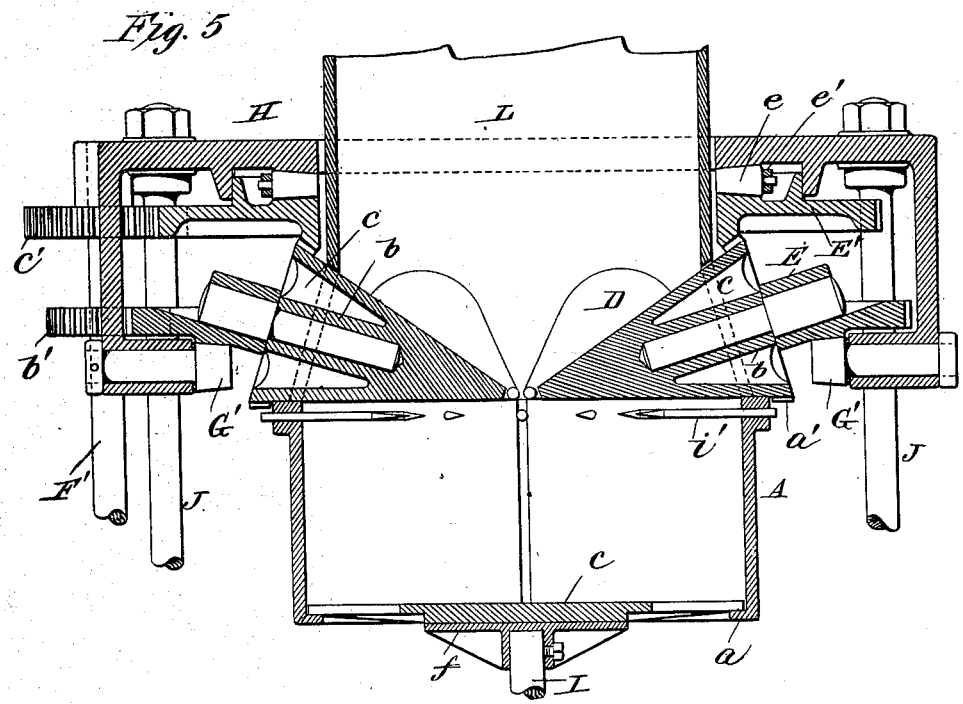
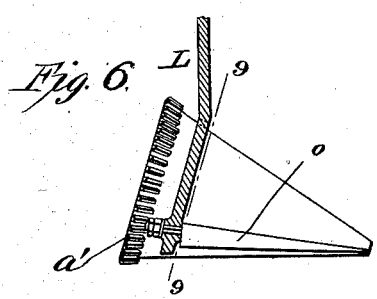
Witnesses: Inventors:

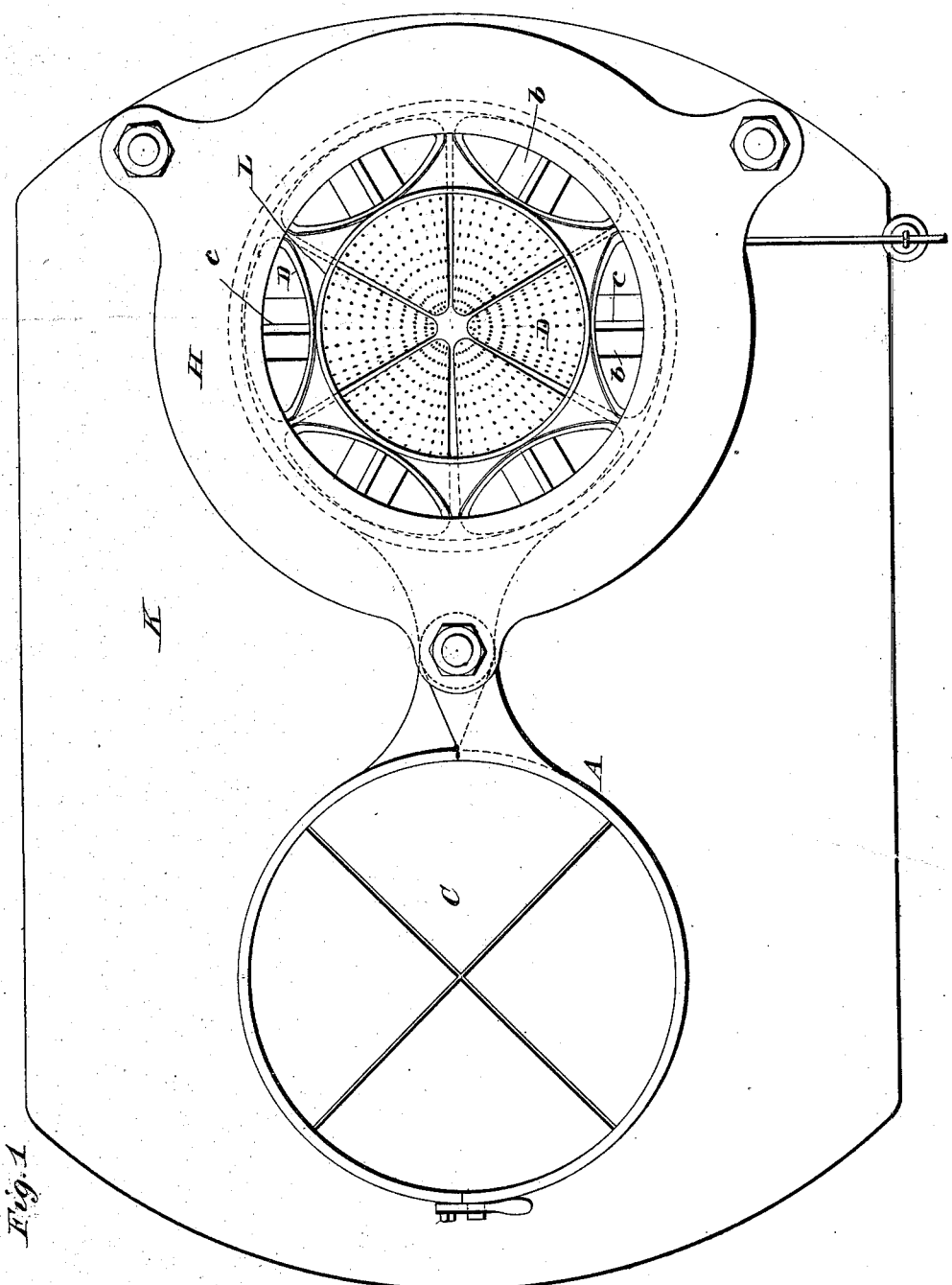

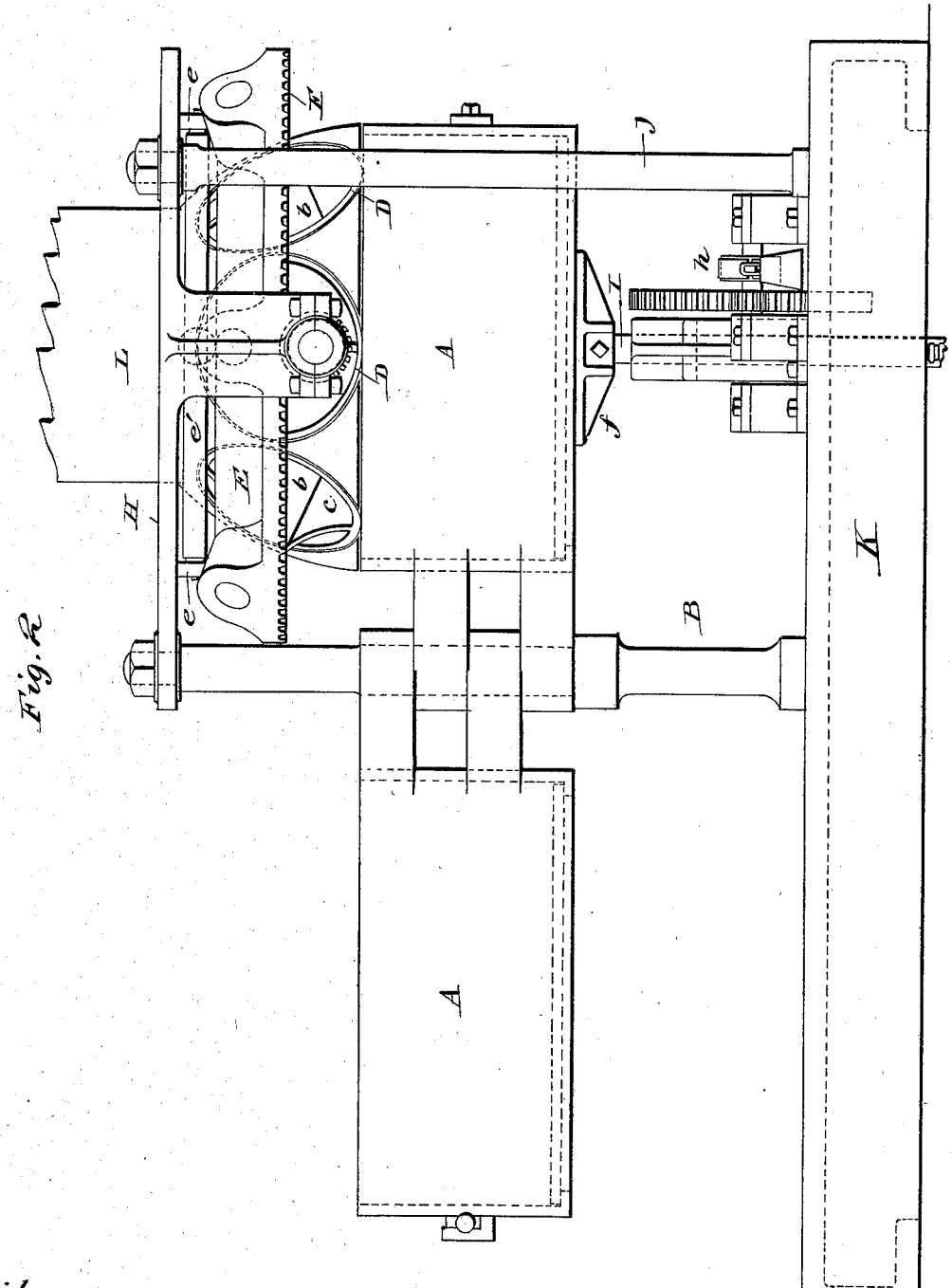

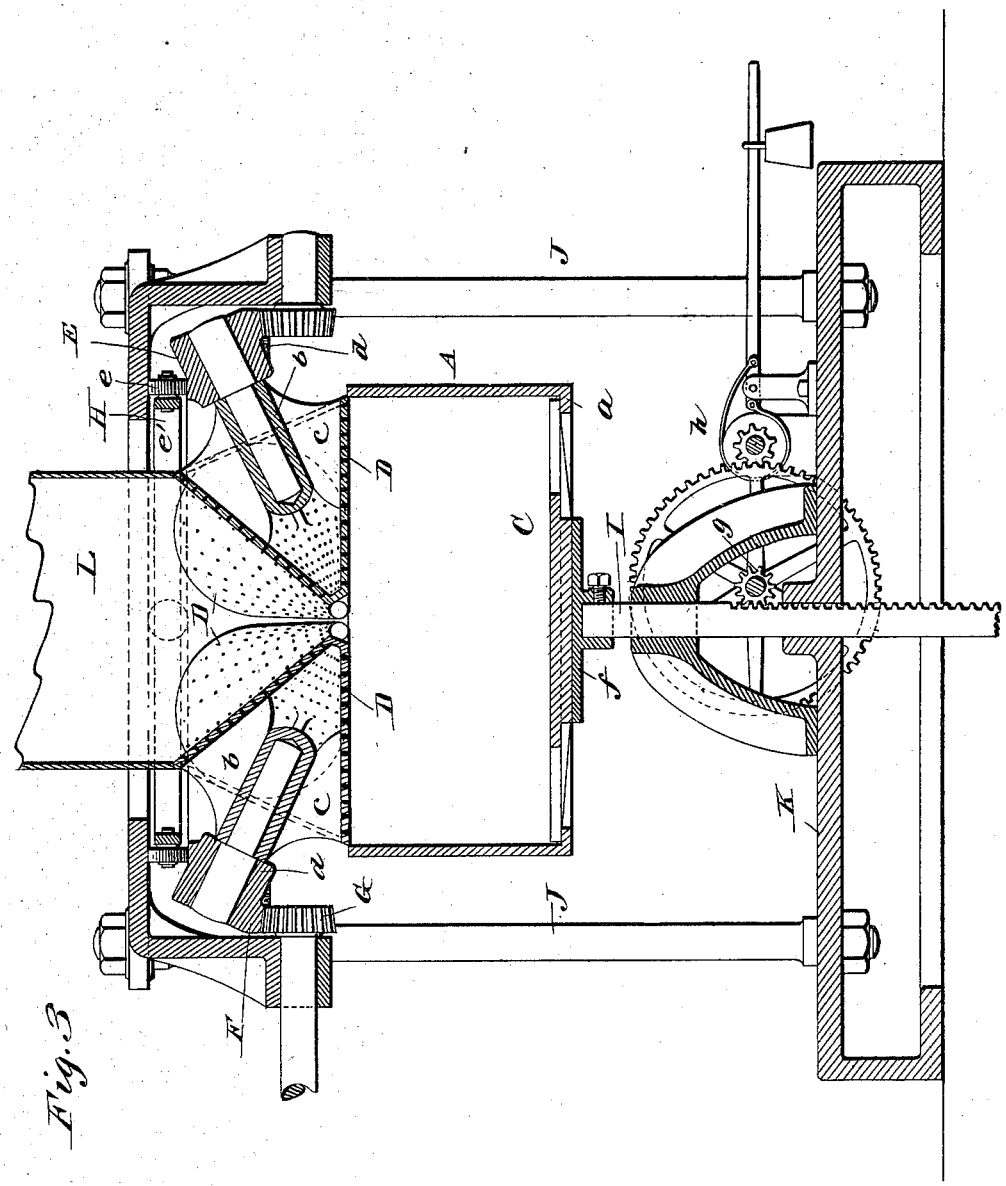

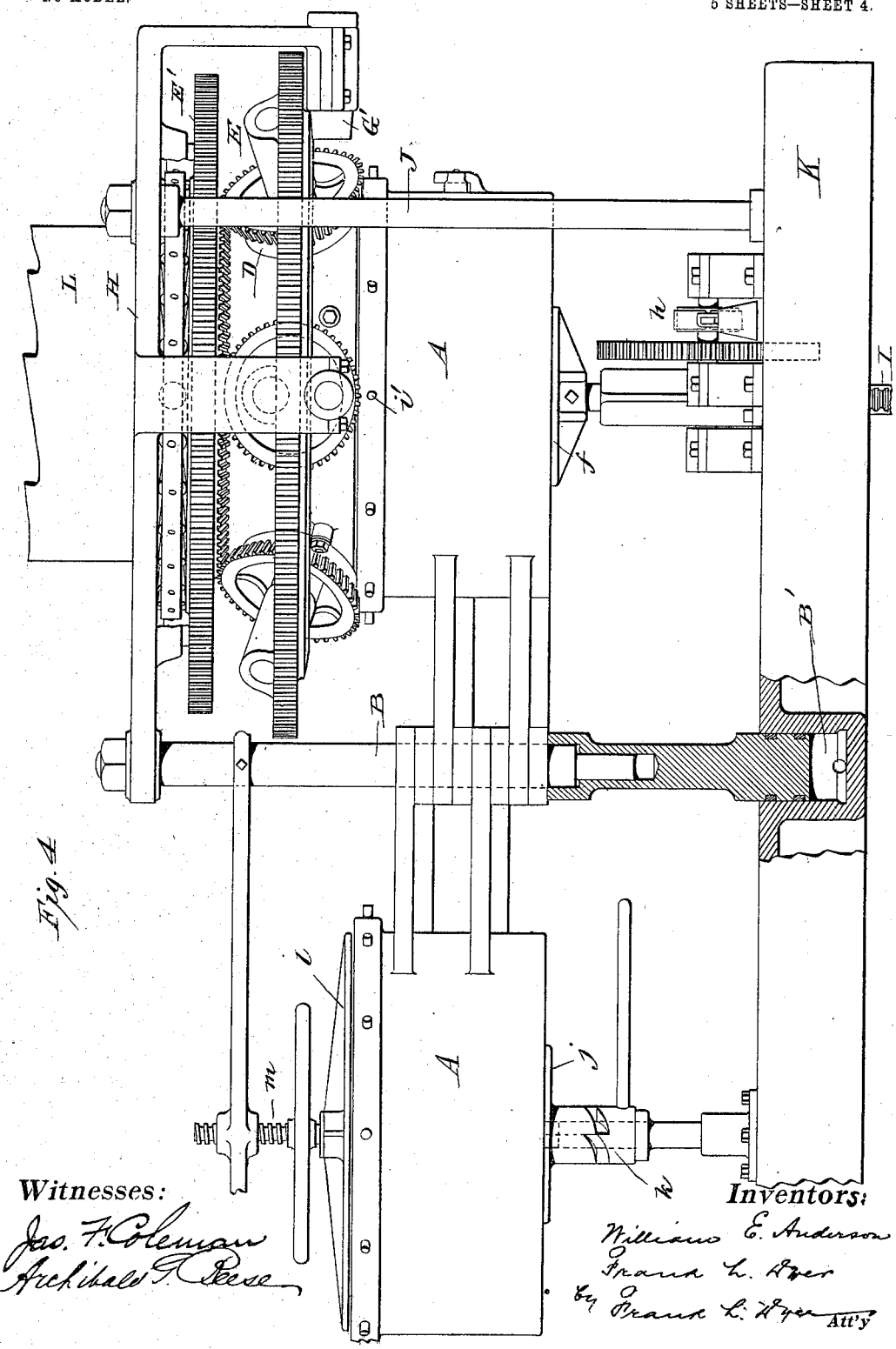

No. 735,435. Patented August 4, 1903.

UNITED STATES PATENT OFFICE.

WILLIAM E. ANDERSON, OF WACO, TEXAS, AND FRANK L. DYER, OF WASHINGTON, DISTRICT OF COLUMBIA, ASSIGNORS, BY MESNE ASSIGNMENTS, TO JULIUS F. WORKUM, OF ENGLEWOOD, NEW JERSEY.

BALE-FORMING APPARATUS.

SPECIFICATION forming part of Letters Patent No. 735,435, dated August 4, 1903.

Application filed October 7, 1897. Serial No. 654,411. (No model.)

*To all whom it may concern:*

Be it known that we, WILLIAM E. ANDERSON, formerly of Waco, in the county of McLennan and State of Texas, and now of Houston, in the county of Harris and State of Texas, and FRANK L. DYER, formerly of Washington, in the District of Columbia, and now of Montclair, in the county of Essex and State of New Jersey, both citizens of the United States, have invented certain new and useful Improvements in Bale-Forming Apparatus; and we do hereby declare the following to be a full, clear, and exact description of the invention, which will enable others skilled in the art to which it appertains to make and use the same.

Our invention relates to improvements in cotton-presses of the type for producing cylindrical end-lap bales; and our object is to provide improvements in the construction of such presses whereby their operation will be facilitated.

In order that the invention may be better understood, attention is directed to the accompanying drawings, forming part of this specification, and in which—

Figure 1 is a plan view of our improved press, illustrating the employment of perforated baling-rolls; Fig. 2, a side view thereof; Fig. 3, a longitudinal section, partly in elevation; Fig. 4, an elevation, partly in section, showing a modification illustrating positively-driven imperforate baling-rolls; Fig. 5, a section on the line 5 5 of Fig. 4; Fig. 6, a detached view of one of the baling-rolls and stripper-plates; Fig. 7, a section on the line 9 9 of Fig. 6.

In all of the above views corresponding parts are designated by the same letters of reference.

A A represent two chambers or holders in which the bales are formed, which in the particular form of apparatus selected for illustration and description are cylindrical casings or boxes made, preferably, of cast-iron, each of said casings being made, preferably, in two or more sections hinged together, so as to be swung apart when the completed bale is to be removed. These sections are to be securely locked together during the formation of the bale in any suitable way. The casings or boxes A are pivotally mounted on a heavy standard B, so that either casing may be swung around into line with the pressure or baling rolls.

In operation it is desirable after a bale has been formed that the casing or box containing it should be slightly lowered, so as to permit the casing or box to swing clear of the baling-rolls, and this result may be effected in any suitable way. For example, as shown in Fig. 4, the standard B may be made of two sections, the lower of which is fitted into a hydraulic cylinder B', supplied with water under pressure. By permitting the water to escape from the cylinder the lower section of the standard will be depressed, withdrawing the box or casing from beneath the baling-rolls and permitting it to swing clear of the same.

C is a movable bottom or bale-base for each casing, which forms a support for the forming bale and is capable of vertical movement therein and being supported by the flange $a$ at the lower edge of the casing when said bottom or bale-base has reached its lowermost position. Bales are formed upon the bottom or bale-base C of each casing which gradually descends, as we will presently describe, as the cotton accumulates.

D D are conical pressure or baling rolls, arranged radially around a center and occupying the entire upper portion of the casing or box A, which is beneath said rollers, so as to compress the cotton into said box or casing. These baling-rolls may be provided with perforated peripheries, as shown in Figs. 1 and 3, so that the rolls will operate as condensers to permit the escape of the air by which the cotton may be blown onto their peripheries; but the rolls may be provided with imperforate peripheries, as shown in Figs. 5 to 7, inclusive. In either case the apices of the rolls are imperforate. Each roll D is provided with a sleeve $b$, upon which the rolling-surface is supported by means of webs $c$. The sleeve $b$ of each baling-roll is mounted on a heavy bearing-piece or stub-shaft $d$, which shafts are carried in a heavy annular casting E. We prefer to mount the baling or pressure rolls D at such an angle to the casting E, as shown, that the lower surfaces of said baling-rolls which rest upon the cotton will extend in a horizontal plane.

By constructing the baling-rolls with imperforate apices and mounting them on the fixed stub-shafts $d$, as explained, so that the baling-rolls will be free from support at their inner ends, we do away with the necessity of applying a lubricant to such parts of the rollers as come into contact with the cotton. In this way we effectively prevent the possibility of contaminating the fiber during the baling operation by accidental leakage of oil from bearings, which would be the case if the rollers were supported at their inner ends either by the employment of a separate bearing for such inner ends or by extending the stub-shafts through openings in the inner ends of the rollers. In the former case the use of separate bearings would necessitate the application of oil which would inevitably exude from the bearings to soil the cotton, and in the latter case the exudation of oil through the perforate lower ends of the rollers would be similarly objectionable. The mounting of the rollers so that they shall be free of support at their inner ends also affords a clear space above their working surfaces to permit an uninterrupted feed of material between them.

In order that the cotton may be properly formed into a sheet or bat and compressed within the casing or box A, it is necessary to revolve either the rolls relatively to the box, or vice versa, preferably the former, and in the drawings we illustrate mechanism by which said rolls may be so operated. With the form of device shown in Figs. 1 to 3, where the rollers are not positively driven, but rotate on their axes by the frictional engagement with the cotton, the casting E is provided on its under surface with a rack, with which a pinion G engages, whereby power may be applied to the pinion, so as to revolve the casting E, carrying the baling-rolls D around within the upper end of the casing A, the friction between the baling-rolls and the cotton causing the former to rotate on their axes. The casting E is supported diametrically to the pinion G by an idler, as shown, and other idlers may be interposed at intermediate points for the same purpose. With the form of device shown in Figs. 4 and 5, wherein the baling-rolls are positively rotated on their axes, the casting E is supported on smooth antifriction-rollers G'. Mounted above the casting E is a ring E', provided with rack-teeth which mesh with teeth $a'$, formed on the outer surface of each baling-roll, as shown. With this modification a power-shaft F' carries two spur-gears $b'$ and $c'$, which mesh with teeth which are cut in the casting E and ring E', respectively. The relation between the gear $b'$ and the teeth on the casting E and the gear $c'$ and the teeth on the ring E' is such that the ring E' revolves in the same direction as the casting E and at twice the speed, whereby the casting E will revolve the baling-rolls with respect to the baling-box A, while the ring E' will rotate the rollers on their axes at the proper surface velocity to compress the cotton in the baling-box without any relative slip.

In order to take up the thrust imposed upon the baling-rolls, we provide a heavy plate or casting H, forming the upper part of the press, and interpose friction-rollers $e\ e$ between said plate and the casting E in Fig. 3 or between said plate and the ring E' in Figs. 4 and 5. The said friction-rollers $e\ e$ are carried in a ring $e'$, which keeps them in their proper path of movement.

In order that the proper pressure may be applied to the cotton during the process of forming the bales, means are employed for resisting the downward movement of the bottom or bale-base C within each cylinder or box, and in the drawings we illustrate a convenient form of brake mechanism which may be used for this purpose.

I is a heavy rod provided with a flat disk or head $f$ at its upper end, which disk or head engages the bottom C of either casing or box A and elevates said bottom to the top of said casing, so as to come in contact with the baling-rolls D. Provision should be made to prevent the bottom C from revolving under the pressure of said rolls, such as by providing the same with a spline engaging a vertical way formed on the inside of each casing or box. The lower portion of the rod I is provided with a rack thereon, with which a pinion $g$ engages, and said pinion $g$ connects, either directly or indirectly through suitable gearing, with a brake-wheel $h$, to which friction is applied. An ordinary band-brake, to which a suitable weight is attached for effecting the pressure on the brake-wheel, may be used for this purpose. The rod I is preferably counterbalanced, so that it will normally be elevated to its upper limit of movement, carrying the bottom C with it, when the friction is removed from the brake-wheel $h$.

J J are braces or tie-rods which connect the upper casting H with a similar lower casting K.

L is a chute or casing leading from the gin or gins or other place of supply to a point immediately in line with the tops of the baling-rolls D, said casing or chute entirely surrounding the upper portions of said rolls and preferably also extending down between said rolls to the top of the casing A, as shown, to prevent the escape of air or cotton from between said rolls. Obviously this casing or chute revolves with the baling-rolls.

For the purpose of retaining the cotton from expansion out of the casing or box after it has been compressed therein we make use of a series of pins $i$, adapted to be driven in at the top of the casing, so as to extend over the completed bale or to be driven into the bale near its upper end. After a bale has been formed, as we shall explain, and the pins $i$ have been driven radially inward to prevent longitudinal expansion of the cotton the casing containing the finished bale is swung to one side and the other casing moved into position for permitting the baling operation to be continued. At this time it is necessary to remove the finished bale from the casing and to permanently secure it from expanding. For this purpose we make use of a supporting-platform $j$, over which the casing containing the completed bale may be swung and provided with cams $k$ for moving it upward into engagement with the bottom C, on which the bale rests. Mounted above the support $j$ is a heading-disk $l$, adapted to be forced downward onto the top of the bale by any suitable mechanism, as by a screw $m$.

In operation one of the casings or boxes is swung around in position beneath the baling-rolls D, and the rod I is elevated so as to carry the bottom C in contact with said rolls. Power is now applied to revolve the casting E, carrying the rolls around in their path of movement and causing said rolls to revolve either frictionally or positively, as explained. Cotton from the gin or gins is now blown or otherwise conveyed through the chute or casing L and is deposited on the baling-rolls D, any air therewith escaping through the perforations in said baling-rolls when used. The rotation of the baling-rolls on their axes carries the cotton accumulated thereon downward through the spaces between them and deposits the cotton on the bottom C, resulting in the formation of an end-lap bale, which gradually increases in its longitudinal dimension. If desired, a stationary stripper-plate $o$ (see Fig. 6) may be employed to cooperate with the baling-rolls to scrape the sheet or bat of cotton off of the same and cause it to be laid evenly onto the end of the forming bale. It will thus be seen that each baling-roll produces a separate and distinct lamina of cotton, which is kept practically continuous and which is being distributed around in the casing or box A in the form of layers resting one upon the other. The cotton which has thus accumulated in layers in the casing or box A on the bottom thereof will be subjected to the pressure of the baling-rolls D, and when that pressure is sufficient to overcome the friction of the brake-wheel $h$ the bottom C, carrying the accumulated cotton with it, commences to slowly descend, the bale being at all times subjected to a sufficient pressure to overcome the resistance supplied by the brake-wheel. In this way a bale will be formed which will be of the same density throughout, and when the casing or box A has been entirely filled with cotton in cylindrical form the bale is ready to be tied up. This is accomplished by driving in the pins $i$ to prevent upward expansion of the cotton, lowering the disk $f$ out of contact with the bottom C, and permitting the filled casing or box to be depressed, as by exhausting the water from the cylinder B'. The casing containing the bale is now swung over into position above the plate $j$, the other casing being swung into position beneath the baling-rolls and permitting the carrying on of the baling operations already described. The plate $j$ is now moved up into engagement with the bottom C, and the heading-disk $l$ is moved downward into contact with the top of the finished bale. The casing or box containing the finished bale can now be opened, withdrawing the pins $i$ from the bale, which will now be held firmly compressed between the bottom plate C and the heading-disk $l$, its sides being completely exposed. It can now be covered with canvas or other covering material, and retaining-wires will then be driven up through the bottom of the bale, and said wires will be then drawn around the bale from the inside to the outside and secured in any suitable way. These retaining-wires may be applied directly to the bale without a covering material. After the bale has been thus secured the pressure of the heading-disk $l$ is released and the bale is removed.

In order to obtain the best results, we prefer to make the baling-rolls truncated, as shown, so as not to extend to the absolute center of the bale, whereby a passage will be formed in the center of the bale, which is of importance, as it allows the retaining-wires to be easily pushed up through the same.

The lower end of the chute or casing L is flared outwardly, as shown, so as to extend substantially parallel with the rear edges of the baling-rolls, whereby cotton deposited on the upper surface of the baling-rolls will be carried by such rolls downward, so as to be compressed in place upon the forming bale without radial contraction. In other words, in order that this result may be secured the distance between the points of the baling-rolls and the wall of the casing or chute adjacent to their upper edges should not be greater than the distance between the points of the baling-rolls and the inner wall of the casing or box in which the bale is formed.

Having now described our invention, what we claim as new therein, and desire to secure by Letters Patent, is as follows:

1. In a bale-forming press, a set of radial feed and pressure rollers having imperforate apices extending close to the center from which they radiate, said rollers being free from support at their inner ends, and supports and operating devices for said rollers.

2. In a bale-forming press, the combination of a revoluble carrier, a plurality of converging conical feed and pressure rollers journaled in said carrier and free from support at their imperforate inner ends and with a space above their working surfaces unobstructed, whereby a clear feed-space for the material is obtained.

3. In a bale-forming press, the combination with a set of radial feed and pressure rollers extending close to the center from which they radiate and free from support at their imperforate inner ends, supports for said rollers and means for revolving the supports about the axis of the baling-chamber, of a baling chamber or casing below the rollers and in which the bale is formed, substantially as set forth.

4. In a bale-forming press, the combination with a set of radial feed and pressure rollers extending close to the center from which they radiate and free from support at their imperforate inner ends, and supports and operating devices for said rollers, of a baling chamber or casing below the rollers and in which the bale is formed, a movable bottom in said casing or baling-chamber, and means for resisting the downward movement of said bottom, substantially as set forth.

5. In a bale-forming apparatus, the combination of compressing mechanism for forming an end-lap bale, a receding bale-base between which and the compressing mechanism the bale is formed, and mechanism coöperating with said bale-base and movable therewith relatively to the compressing mechanism, for directly engaging the bale and preventing longitudinal expansion thereof when the bale and its bale-base are moved out of line with the compressing mechanism, substantially as set forth.

6. In a bale-forming press, the combination with a compressing mechanism for forming an end-lap bale, of a downwardly-movable bale-base between which and the compressing mechanism the bale is formed, a series of pins arranged to directly engage the bale at or near its upper end, and connections between said pins and said bale-base, substantially as set forth.

7. In a bale-forming press, the combination with a compressing mechanism for forming an end-lap bale, of a baling-chamber beneath the compressing mechanism and in which the bale is formed, a downwardly-movable bottom for said chamber, and a series of pins carried by the box near its upper end for directly engaging the bale to prevent upward expansion thereof, substantially as set forth.

8. In a bale-forming press, the combination with a revoluble carrier and a plurality of converging conical feed and pressure rollers journaled in said carrier, of a chute or casing above the carrier and revoluble therewith for feeding cotton to be baled to the feed and pressure rollers, said chute or casing at its lower portion being flared outwardly so as to extend substantially perpendicular to the axes of said feed and pressure rollers, for the purpose mentioned, substantially as set forth.

9. In a bale-forming press, the combination with a revoluble carrier and a plurality of converging conical feed and pressure rollers journaled in said carrier, of a chute or casing above the carrier and revoluble therewith for feeding cotton to be baled to the feed and pressure rollers, said chute or casing being extended downwardly so as to embrace the bases of the rollers and close the gaps between them, substantially as shown.

10. In an apparatus for forming cylindrical cotton bales, the combination of a casing, a perforated conical baling-roll at one end of said casing, on which a bat or sheet of cotton is formed, whereby one edge travels faster than the other and by which said sheet or bat will be subjected to pressure, means for directing the cotton to said roll, and means for resisting the longitudinal movement of the forming bale in said casing, substantially as set forth.

11. In an apparatus for forming cylindrical cotton bales, the combination of the casing in which the bale is formed, a plurality of perforated conical baling-rolls at one end of said casing, upon which a corresponding number of sheets or bats of cotton will be formed, whereby one edge of each bat travels faster than the other edge, and by which said sheets or bats will be subjected to pressure, said conical baling-rolls occupying substantially the entire mouth of the casing, and means for resisting longitudinal movement of the forming bale, substantially as set forth.

12. In apparatus for baling fibrous materials, the combination of a bale-holder, a bale-base movable with respect to the same, compressing mechanism for forming an end-lap bale in the bale-holder and against said bale-base and which exerts a continuous pressure on the forming bale, and pins carried by the bale-holder and movable radially thereon to clamp the end of the formed bale and confine it against expansion when the bale-holder is moved out of line with the compressing mechanism, substantially as set forth.

13. In apparatus for baling fibrous materials, the combination of a sectional bale-holder, a bale-base movable with respect to the same, compressing mechanism for forming an end-lap bale in the bale-holder and against said bale-base and which exerts a continuous pressure on the forming bale, and pins carried by the bale-holder and movable radially thereon to clamp the end of the formed bale and confine it against expansion when the bale-holder is moved out of line with the compressing mechanism, substantially as set forth.

14. In apparatus for baling fibrous materials, the combination of compressing mechanism for forming an end-lap bale and which exerts a continuous pressure on the forming bale, a plurality of bale-holders movable into line with the compressing mechanism and in which bales are successively formed, a bale-base movably mounted in each bale-holder and against which the bale is formed, and pins carried by each bale-holder and movable radially thereon to clamp the end of the formed bale and confine it against expansion when the bale-holder is moved out of line with the compressing mechanism, substantially as and for the purposes set forth.

15. In apparatus for baling fibrous material, the combination of compressing mechanism for forming an end-lap bale and for exerting a continuous pressure on the forming bale, a bale-holder, a plunger coöperating with the compressing mechanism for exerting pressure on the forming bale, said plunger being movable out of its operative relation to the bale, means for preventing expansion of the bale at the end with which the plunger coöperates when the latter is withdrawn, and pins carried by the bale-holder and movable radially thereon to clamp the other end of the formed bale and confine it against expansion when the bale-holder is moved out of line with the compressing devices, substantially as and for the purposes set forth.

This specification signed and witnessed this 28th day of September, 1897.

WILLIAM E. ANDERSON.

Witnesses to the signature of William E. Anderson:

W. K. MENDENHALL,
J. W. GRAVES.

This specification signed and witnessed this 6th day of October, 1897.

FRANK L. DYER.

Witnesses to the signature of Frank L. Dyer:

PHILIP F. LARNER,
L. DELLA McGIRR.